(12) United States Patent
Jiroku

(10) Patent No.: US 8,994,904 B2
(45) Date of Patent: Mar. 31, 2015

(54) ELECTRO-OPTIC DEVICE AND PROJECTION-TYPE DISPLAY APPARATUS

(75) Inventor: Hiroaki Jiroku, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/232,479

(22) Filed: Sep. 14, 2011

(65) Prior Publication Data

US 2012/0120357 A1 May 17, 2012

(30) Foreign Application Priority Data

Nov. 15, 2010 (JP) ................................ 2010-254587

(51) Int. Cl.
*G02F 1/1333* (2006.01)
*G02F 1/1362* (2006.01)

(52) U.S. Cl.
CPC ...... *G02F 1/136227* (2013.01); *G02F 2201/50* (2013.01)
USPC .......................................... 349/138; 349/113

(58) Field of Classification Search
USPC .......................................... 349/123, 138, 113
See application file for complete search history.

(56) References Cited

U.S. PATENT DOCUMENTS

| 6,774,965 B2* | 8/2004 | Nakashima et al. .......... 349/114 |
| 7,038,748 B2* | 5/2006 | Sasaki ............................ 349/113 |
| 2007/0058102 A1* | 3/2007 | Shimizu et al. ................ 349/44 |
| 2009/0128720 A1* | 5/2009 | Toriyama et al. ................ 349/8 |

FOREIGN PATENT DOCUMENTS

| JP | 10-039292 A | 2/1998 |
| JP | 2000-098408 A | 4/2000 |
| JP | 2000-340796 A | 12/2000 |
| JP | 2001-100248 A | 4/2001 |
| JP | 2002-043416 A | 2/2002 |
| JP | 2009-122256 A | 6/2009 |
| JP | 2010-139862 A | 6/2010 |

* cited by examiner

*Primary Examiner* — Richard Kim
*Assistant Examiner* — Kendrick Hsu
(74) *Attorney, Agent, or Firm* — ALG Intellectual Property, LLC

(57) ABSTRACT

An electro-optic device is provided with an substrate, in which a stress relieving film formed of a doped silicon oxide film is formed between a third interlayer insulating film formed of a non-doped silicon oxide film and a pixel electrode formed of an aluminum film or the like. The stress relieving film is formed of the doped silicon oxide film, has a thermal expansion coefficient different from that of the third interlayer insulating film, comes in contact with the third interlayer insulating film, has a thermal expansion coefficient different from that of the pixel electrode, and comes in contact with the pixel electrode. The thermal expansion coefficients are in the following relation of Third Interlayer Insulating Film<Stress relieving Film<Pixel Electrode.

15 Claims, 9 Drawing Sheets

ELECTRO-OPTIC DEVICE AND PROJECTION-TYPE DISPLAY APPARATUS

BACKGROUND

1. Technical Field

The present invention relates to an electro-optic device provided with an element substrate on which a reflective pixel electrode is formed, and a projection-type display apparatus provided with the electro-optic device.

2. Related Art

In electro-optic devices such as a liquid crystal device, an organic electroluminescence display device, and a plasma display device, an element substrate provided with a pixel transistor, an interlayer insulating film, and a pixel electrode in this order on one side of a substrate body is used. For example, the element substrate used in a reflection-type liquid crystal device of the electro-optic devices is provided with a pixel transistor, an interlayer insulating film, a reflective pixel electrode such as an aluminum film, and an alignment film in this order on one side of a substrate body (see JP-A-2010-139862).

In the liquid crystal device, an insulating film formed of a silicon oxide film or a silicon nitride film may be formed on the surface of the reflective pixel electrode. For example, when a rhombic vapor-deposited film such as a silicon oxide film is used as the alignment film, a planarized insulating film formed of a silicon oxide film or a silicon nitride film is formed as an insulating film on the surface of the reflective pixel electrode.

However, after the insulating film is formed on the upper layer side of the pixel electrode after forming the reflective pixel electrode, significant thermal stress occurs on the pixel electrode due to heat generated when forming the insulating film, there is a problem in that the thermal stress may cause a defect, such as hillock on the surface of the pixel electrode. For example, when an insulating film is formed in a state where a pixel electrode formed of an aluminum film is formed on the upper layer of an interlayer insulating film formed of a non-doped silicon oxide film, a difference between the thermal expansion coefficient ($23.1 \times 10^{-6}$/° C.) of the aluminum film and the thermal expansion coefficient ($0.5 \times 10^{-6}$/° C.) of the non-doped silicon oxide film is large, and thus significant thermal stress occurs in the pixel electrode. As a result, a defect such as hillock occurs on the surface of the pixel electrode by thermal stress, smoothness of the surface of the pixel electrode decreases, and the reflectance of the pixel electrode decreases.

SUMMARY

An advantage of some aspects of the invention is to provide an electro-optic device capable of preventing a defect such as hillock caused by thermal stress from occurring on the surface of the pixel electrode, and a projection-type display apparatus using the electro-optic device.

According to an aspect of the invention, there is provided an electro-optic device including: a pixel transistor that is provided on one side of a substrate body for an element substrate; an interlayer insulating film that covers the pixel transistor from the opposite side to the side on which the substrate body is positioned; a reflective pixel electrode that is provided corresponding to the pixel transistor on the opposite side to the side on which the substrate body is positioned with respect to the interlayer insulating film, and has a thermal expansion coefficient different from that of the interlayer insulating film; a transparent insulating film that covers the pixel electrode from the opposite side to the side on which the substrate body is positioned; and an insulating stress relieving film that is provided between the interlayer insulating film and the pixel electrode, in which the part coming in contact with the interlayer insulating film has an thermal expansion coefficient different from that of the interlayer insulating film, and the part coming in contact with the pixel electrode has a thermal expansion coefficient different from that of the pixel electrode.

In the aspect of the invention, "an insulating stress relieving film that is provided between the interlayer insulating film and the pixel electrode, in which the part coming in contact with the interlayer insulating film has an thermal expansion coefficient different from that of the interlayer insulating film, and the part coming in contact with the pixel electrode has a thermal expansion coefficient different from that of the pixel electrode" means that, when the stress relieving film is a monolayer film, the monolayer film has a thermal expansion coefficient different from those of the interlayer insulating film and the pixel electrode. When the stress relieving film is a multilayer film, in the stress relieving film, the layer coming in contact with the interlayer insulating film has a thermal expansion coefficient different from that of the interlayer insulating film, and the layer coming in contact with the pixel electrode has a thermal expansion coefficient different from that of the pixel electrode.

In the aspect of the invention, the stress relieving film is interposed between the interlayer insulating film and the pixel electrode, and the stress relieving film has a thermal expansion coefficient different from that of the interlayer insulating film, comes in contact with the interlayer insulating film, has a thermal expansion coefficient different from that of the pixel electrode, and comes in contact with the pixel electrode. For this reason, even when thermal stress caused by the difference between the thermal expansion coefficient of the interlayer insulating film and the thermal expansion coefficient of the pixel electrode occurs in the pixel electrode when forming the insulating film, it is possible to reduce the occurrence of the thermal stress as compared with the case where the interlayer insulating film comes in direct contact with the pixel electrode. Accordingly, it is possible to prevent a defect such as hillock caused by the thermal stress from occurring on the surface of the pixel electrode, and thus it is possible to prevent smoothness of the surface of the pixel electrode from decreasing which decreases reflectance of the pixel electrode.

In the electro-optic device, it is preferable that an outermost surface layer of the pixel electrode is formed of an aluminum film (also including an aluminum alloy film). Since the aluminum film (thermal expansion coefficient=$23.1 \times 10^{-6}$/° C.) has a great difference in thermal expansion coefficient from the non-doped silicon oxide film (thermal expansion coefficient=$0.5 \times 10^{-6}$/° C.) or the like, significant thermal stress easily occurs, and a defect such as hillock easily occurs. Accordingly, when the invention is applied to the case where the outermost surface layer of the pixel electrode is formed of the aluminum film, it is possible to effectively prevent defects such as hillock from occurring on the surface of the pixel electrode.

In the electro-optic device, it is preferable that the stress relieving film is a monolayer film having a thermal expansion coefficient between the thermal expansion coefficient of the interlayer insulating film and the thermal expansion coefficient of the pixel electrode. According to the configuration, the stress relieving film relieves the difference in thermal expansion coefficient between the interlayer insulating film and the pixel electrode, and thus it is possible to prevent the thermal stress from occurring in the pixel electrode.

In the electro-optic device, it is preferable that the stress relieving film is a monolayer film having a thermal expansion coefficient smaller than the thermal expansion coefficient of the interlayer insulating film and the thermal expansion coefficient of the pixel electrode. According to the configuration, the stress relieving film is provided between the layers having large thermal expansion coefficients (the interlayer insulating film and the pixel electrode) from above and below. Accordingly, the thermal stress caused by the difference in thermal expansion coefficient between the interlayer insulating film and the stress relieving film, and the thermal stress caused by the difference in thermal expansion coefficient between the stress relieving film and the pixel electrode cancel each other out, and thus it is possible to prevent defects such as hillock caused by thermal stress from occurring on the surface of the pixel electrode.

In the electro-optic device, it is preferable that the stress relieving film is provided with a first stress relieving film having a thermal expansion coefficient different from that of the interlayer insulating film and coming in contact with the interlayer insulating film, and a second stress relieving film having a thermal expansion coefficient different from those of the first stress relieving film and the pixel electrode and coming in contact with the first stress relieving film and the pixel electrode. According to the configuration, the first stress relieving film is provided between the interlayer insulating film and the second stress relieving film from up and down, and the second stress relieving film is provided between the first stress relieving film and the pixel electrode from up and down. Accordingly, the thermal stress caused by the difference in thermal expansion coefficient between the interlayer insulating film and the first stress relieving film, the thermal stress caused by the difference in thermal expansion coefficient between the first stress relieving film and the second stress relieving film, and the thermal stress caused by the difference in thermal expansion coefficient between the second stress relieving film and the pixel electrode cancel each other out, and thus it is possible to prevent defects such as hillock caused by thermal stress from occurring on the surface of the pixel electrode.

In the electro-optic device, it is preferable that the first stress relieving film has a thermal expansion coefficient larger than that of the interlayer insulating film, and the second stress relieving film has a thermal expansion coefficient smaller than those of the first stress relieving film and the pixel electrode.

In the electro-optic device, it is preferable that at least a part of the insulating film coming in contact with the pixel electrode is formed of a doped silicon oxide film which is doped by at least one of phosphorus and boron. According to the configuration, the thermal expansion coefficient (2 to 4× $10^{-6}/°C$.) of the doped silicon oxide film has a small difference from the thermal expansion coefficient ($23.1×10^{-6}/°C$.) of the aluminum film constituting the pixel electrode or the thermal expansion coefficient of the other metal material, as compared with the thermal expansion coefficient ($0.5×10^{-6}/°C$.) of the non-doped silicon oxide film. For this reason, even when the doped silicon oxide is formed in a state where it is heated, significant thermal stress does not occur in the pixel electrode and the insulating film, and thus defects such as hillock hardly occur on the surface of the pixel electrode.

When the electro-optic device is configured as a liquid crystal device, it is preferable to further include an opposed substrate that is opposed to one side of the element substrate and a liquid crystal layer that is kept between the element substrate and the opposed substrate, wherein an alignment film is provided on the outermost surface of the element substrate.

In the electro-optic device, it is preferable that the alignment film is formed of an inorganic alignment film. According to the configuration, since it is not necessary to perform a rubbing process differently from an organic alignment film, an increase in costs caused by the rubbing process or a difference in alignment characteristic does not occur.

According to another aspect of the invention, there is provided a projection-type display apparatus provided with the electro-optic device, in which the electro-optic device is a liquid crystal device and the liquid crystal device is used as a light valve, including: a light source unit that outputs light supplied to the electro-optic device; and a projection optical system that projects light modulated by the electro-optic device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
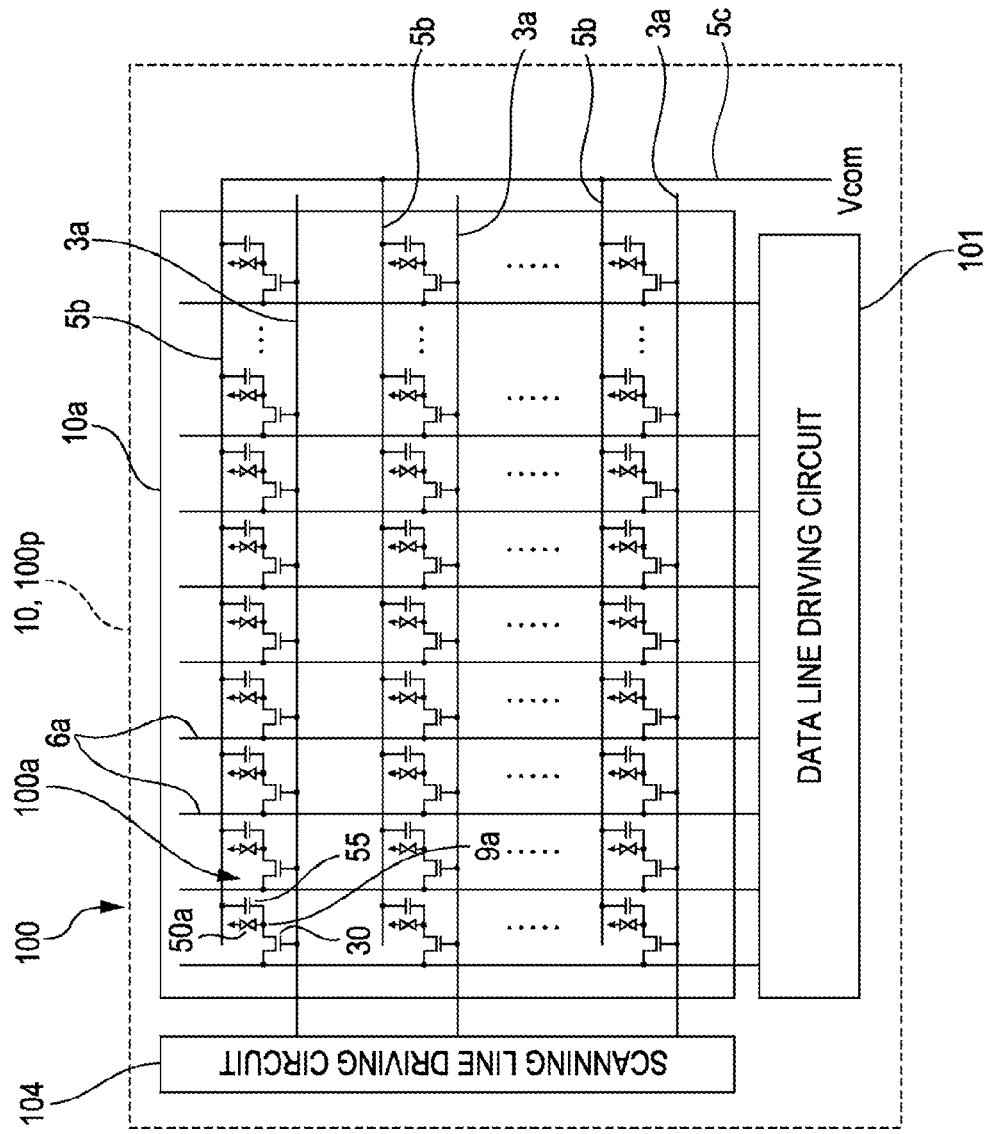
FIG. 1 is a block diagram illustrating an electrical configuration of an electro-optic device according to the invention.

Embodiments of the invention will be described with reference the drawings. In the drawings referred to in the following description, layers and members are reduced in scale to make them recognizable on the drawings. In an electric field effect transistor used as a pixel transistor, the source and drain are switched according to reversal of the current flowing direction, but in the following description, for convenience, the side coming in contact with a pixel electrode is the drain, and the side coming in contact with a data line is the source. When describing a configuration of an element substrate, the side where a substrate body of the element substrate is positioned is the lower layer side, and the opposite side to the side where the substrate body of the element substrate is positioned is the upper layer side. In the layer formed on the element substrate, the surface and surface layer mean the face or a layer on the opposite side to the side where the substrate body is positioned.

Embodiment 1

Overall Configuration

FIG. 1 is a block diagram illustrating an electrical configuration of an electro-optic device according to the invention. In FIG. 1, an electro-optic device 100 of the embodiment is a reflection-type liquid crystal device, and has a reflection-type liquid crystal panel 100p of a TN (Twisted Nematic) mode or a VA (Vertical Alignment) mode. The liquid crystal panel 100p is provided with a pixel area 10a (image display area) in which a plurality of pixels 100a are arranged in matrix at the center area thereof. In the liquid crystal panel 100p, in an element substrate 10 (see FIG. 2A and FIG. 2B) to be described later, a plurality of data lines 6a and a plurality of scanning lines 3a are longitudinally and transversely arranged in the pixel area 10a, and the pixels 100a are provided at positions corresponding to the intersections thereof. Each of the pixels 100a is provided with a pixel transistor 30 formed of an electric field effect transistor, and a pixel electrode 9a to be described later. A source of the pixel transistor 30 is electrically connected to the data line 6a, the gate of the pixel transistor 30 is electrically connected to the scanning line 3a, and the drain of the pixel electrode 30 is electrically connected to the pixel electrode 9a.

A scanning line driving circuit 104 and a data line driving circuit 101 are provided on the outer peripheral side out of the pixel area 10a of the element substrate 10. The data line driving circuit 101 is electrically connected to the data lines 6a, and sequentially supplies image signals supplied from an image processing circuit, to the data lines 6a. The scanning line driving circuit 104 is electrically connected to the scanning lines 3a, and sequentially supplies scanning signals to the scanning lines 3a.

For each pixel 100a, the pixel electrode 9a is opposed to a common electrode formed on an opposed substrate 20 (see FIG. 2A and FIG. 2B) to be described later with a liquid crystal layer interposed therebetween, to constitute a liquid crystal capacity 50a. A retention capacity 55 is added to each pixel 100a parallel to the liquid crystal capacity 50a to prevent an image signal retained in the liquid crystal capacity 50a from fluctuating. In the embodiment, to constitute the retention capacity 55, capacity lines 5b are formed parallel to the scanning lines 3a throughout the plurality of pixels 100a. In the embodiment, the capacity lines 5b are electrically connected to a common potential line 5c to which a common potential Vcom is applied.

Configuration of Liquid Crystal Panel 100p and Element Substrate 10

Figure 2A:
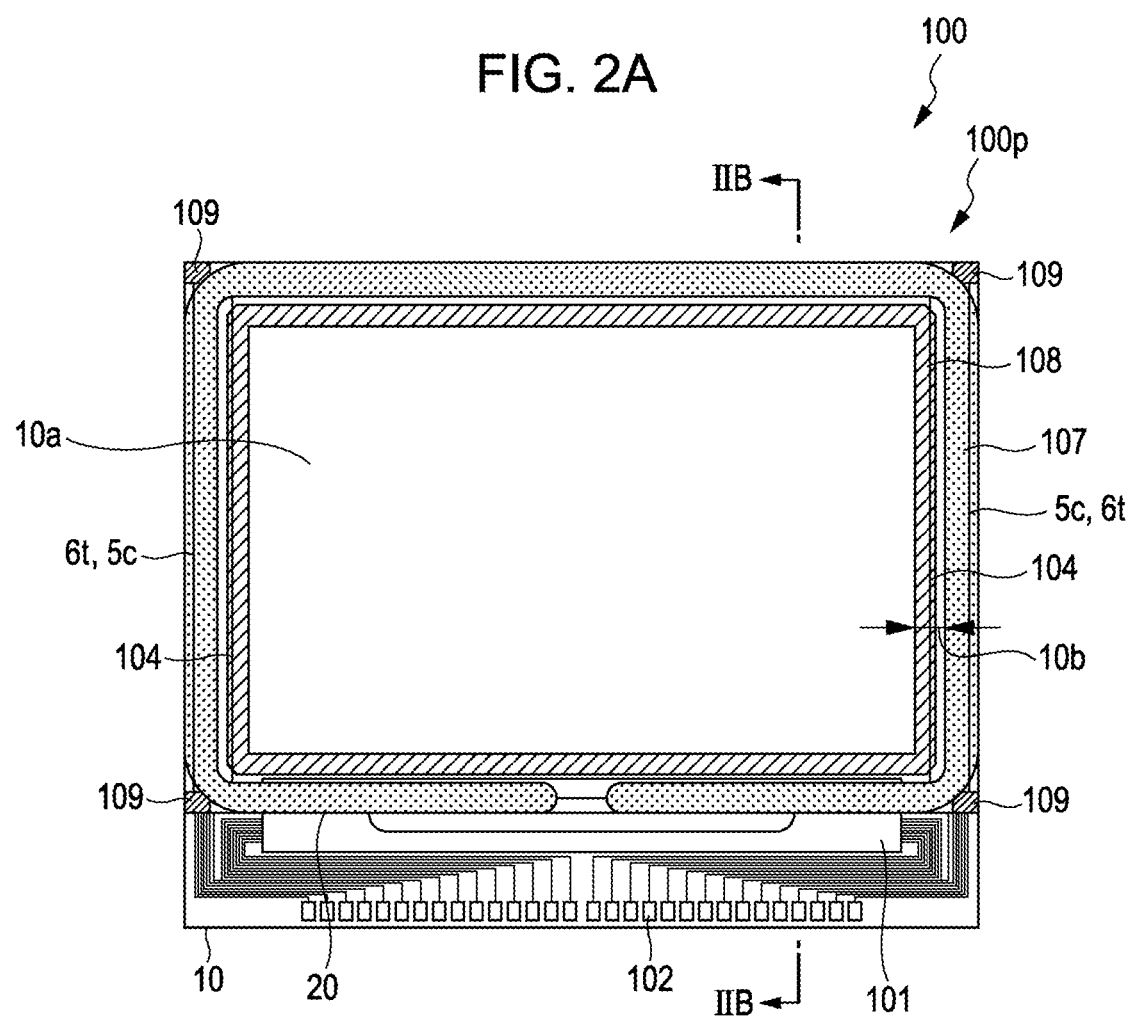
FIG. 2A and FIG. 2B are diagrams illustrating a liquid crystal panel used in the electro-optic device according to the invention.
Figure 2B:
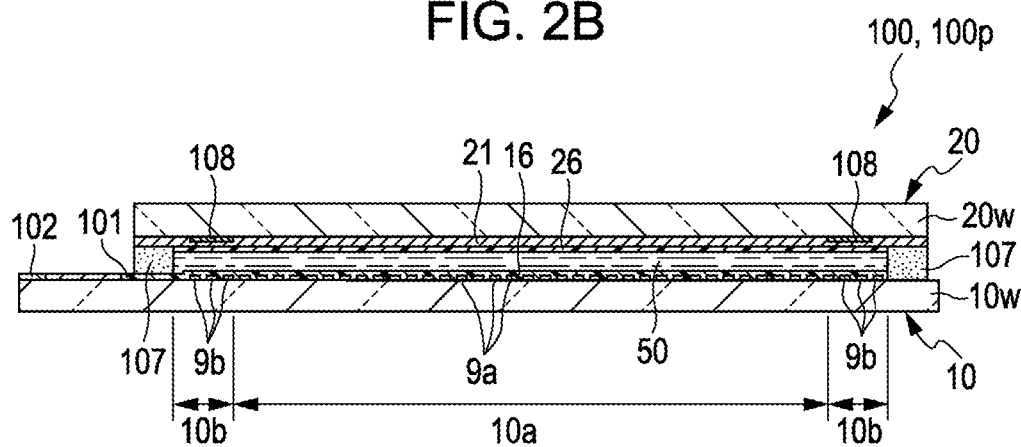

FIG. 2A and FIG. 2B are diagrams illustrating a liquid crystal panel 100p used in the electro-optic device 100 according to the invention, FIG. 2A is a plan view of the liquid crystal panel 100p of the electro-optic device 100 according to the invention as viewed from the side of the opposed substrate with constituent elements, and FIG. 2B is a cross-sectional view thereof taken along the line IIB-IIB. As shown in FIG. 2A and FIG. 2B, in the liquid crystal panel 100p, the element substrate 10 and the opposed substrate 20 are joined by a seal member 107 with a predetermined gap, and the seal member 107 is provided in a frame shape along an outer frame of the opposed substrate 20. The seal member 107 is an adhesive agent formed of light-curing resin or thermosetting resin, in which a gap member, such as glass fibers and glass beads, is mixed such that the distance between both substrates becomes a predetermined value.

In the liquid crystal panel 100p with such a configuration, both of the element substrate 10 and the opposed substrate 20 are square, and the pixel area 10a described with reference to FIG. 1 is provided as a square area substantially at the center of the liquid crystal panel 100p. The seal member 107 is also substantially square corresponding to the shape, a substantially square peripheral area 10b is provided in a frame shape between the inner periphery of the seal member 107 and the outer periphery of the pixel area 10a. In the element substrate 10, the data line driving circuit 101 and a plurality of terminals 102 are formed along one side of the element substrate 10 on the outside of the pixel area 10a, and the scanning line driving circuit 104 is formed along the other side adjacent to the one side. The terminals 102 are connected to a flexible wiring board (not shown), and various potentials or various signals are input to the element substrate 10 through the flexible wiring board.

Although details will be described later, in the pixel area 10a on one side of the element substrate 10, the pixel transistors 30 described with reference to FIG. 1 and the pixel electrodes 9a provided corresponding to the pixel transistors 30 are formed in a matrix, and the alignment film 16 is formed on the upper layer side of the pixel electrodes 9a. In the peripheral area 10b on the one side of the element substrate 10, dummy pixel electrodes 9b are formed together with the pixel electrodes 9a. In the dummy pixel electrodes 9b, a configuration of electrically connecting to dummy pixel transistors, a configuration of directly and electrically connecting to wirings without providing the dummy pixel transistors, or a configuration of a float state where potential is not applied are employed. When planarizing the face on which the alignment film 16 is formed on the element substrate 10 by polishing, the dummy pixel electrodes 9b contribute to making height positions between the pixel area 10a and the peripheral area 10b uniform and making the face on which the alignment film 16 is formed flat. When the dummy pixel electrodes 9b are set to a predetermined potential, alignment of liquid crystal molecules is prevented from being confused at the end portion on the outer peripheral side of the pixel area 10a.

A common electrode 21 is formed on one side of the opposed substrate 20 opposed to the element substrate 10, and an alignment film 26 is formed on the upper layer of the common electrode 21. The common electrode 21 is formed substantially on the whole face of the opposed substrate 20 or throughout the plurality of pixels 100a as a plurality of stripe-shaped electrodes. On one side of the opposed substrate 20 opposed to the element substrate 10, a light shield layer 108 is formed on the lower layer side of the common electrode 21. In the embodiment, the light shield layer 108 is formed in a frame shape extending along the outer periphery of the pixel area 10a. The outer periphery of the light shield layer 108 is at a position separating the gap from the inner periphery of the seal member 107, and the light shield layer 108 does not overlap with the seal member 107. In the opposed substrate 20, the light shield layer 108 may be formed in an area overlapping with an area pinched between pixel electrodes 9a adjacent to each other.

In the liquid crystal panel 100p with such a configuration, the element substrate 10 has an inter-substrate connecting unit 109 for electrical connection between the element substrate 10 and the opposed substrate 20 in an area overlapping with angled parts of the opposed substrate 20 on the side outer than the seal member 107. The inter-substrate connecting unit 109 is provided with an inter-substrate connecting member 109a including conductive particles, and the common electrode 21 of the opposed substrate 20 is electrically connected to the element substrate 10 through the inter-substrate connecting member 109a. For this reason, the common potential Vcom is applied from the side of the element substrate 10 to the common electrode 21. The seal member 107 has substantially the same width size, and is provided along the outer periphery of the opposed substrate 20. For this reason, the seal member 107 is substantially square. However, the seal member 107 is provided to pass through the inside by avoiding the inter-substrate connecting unit 109 in the area overlapping with the angled parts of the opposed substrate 20, and the angled parts of the seal member 107 have a substantially circular arc shape.

In the electro-optic device 100 with such a configuration, in the embodiment, the common electrode 21 is formed of a transparent conductive film, and the pixel electrode 9a is formed of a reflective conductive film. For this reason, in the electro-optic device 100 according to the embodiment, light input from the opposed substrate 20 side is reflected on the element substrate 10 side, and is modulated while it is output from the opposed substrate 20 side, thereby displaying an image.

The electro-optic device 100 may be used as a color display device of an electronic apparatus such as a mobile computer and a mobile phone. In this case, the opposed substrate 20 is provided with a color filter (not shown) or a protective film. In the electro-optic device 100, a polarization film, a phase differential film, a polarization plate, and the like are provided in a predetermined direction with respect to the liquid crystal panel 100p, according to kinds of used liquid crystal layer 50, or each of a normally white mode and a normally black mode. The electro-optic device 100 may be used as a light valve for RGB in a projection-type display apparatus (liquid crystal projector) to be described later. In this case, each color of light resolved through a dichroic mirror for resolving RGB is input as transmission light to each of the electro-optic devices 100 for RGB, and a color filter is not formed.

Hereinafter, in the electro-optic device 100 of the embodiment, as the liquid crystal layer 50, a nematic liquid crystal compound with negative dielectric anisotropy may be employed, and a case where the liquid crystal panel 100p is configured for a VA mode will be mainly described.

Specific Configuration of Pixel

Figure 3A:
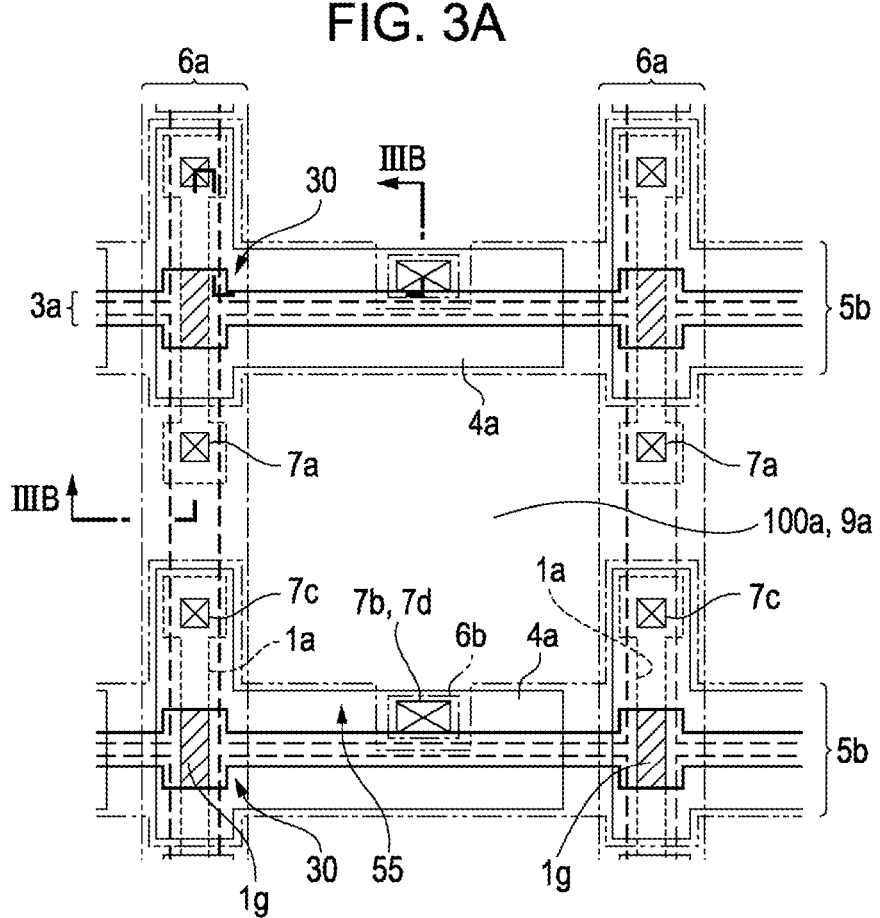
FIG. 3A and FIG. 3B are diagrams illustrating a pixel of an electro-optic device according to Embodiment 1 of the invention.
Figure 3B:
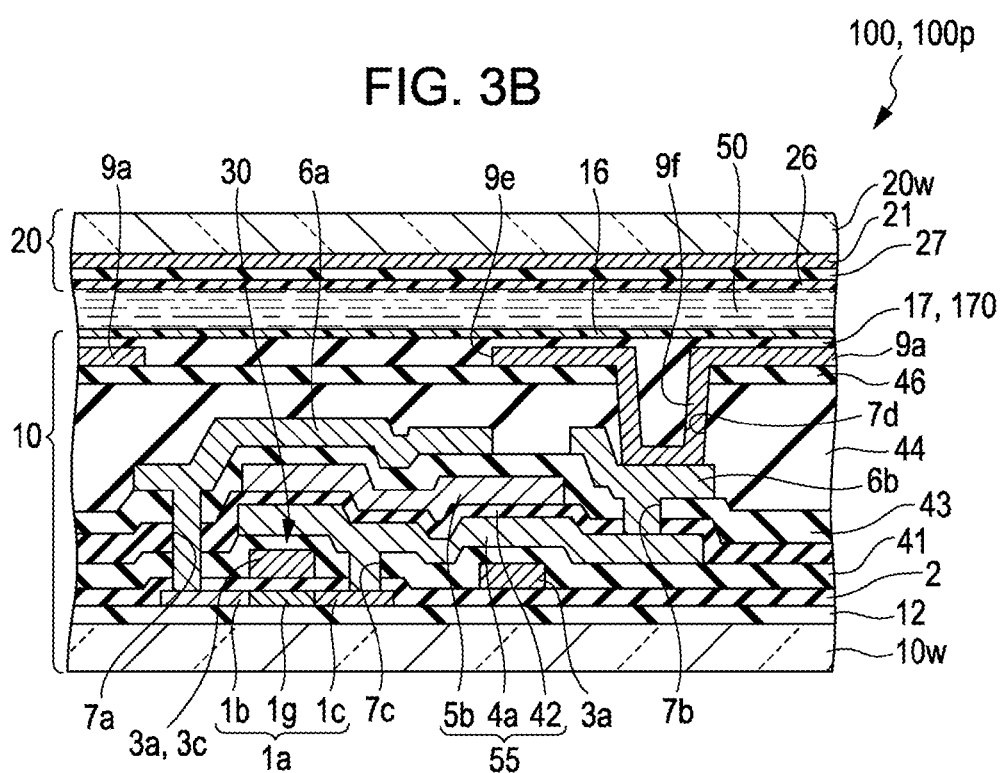

FIG. 3A and FIG. 3B are diagrams illustrating pixels of the electro-optic device 100 according to Embodiment 1 of the invention, in which FIG. 3A is a plan view of pixels adjacent to each other in the element substrate 10 used in the electro-optic device 100 according to the invention, and FIG. 3B is a cross-sectional view of the electro-optic device 100 taken along the line IIIB-IIIB shown in FIG. 3A. In FIG. 3A, a semiconductor layer 1a is represented by a thin and short dot line, a scanning line 3a is represented by a thick solid line, the data line 6a and a thin film formed together with it are represented by a chain line, a capacity line 5b is represented by two-dot chain line, the pixel electrode 9a is represented by a thick and long broken line, and a lower electrode layer 4a is represented by a thin solid line.

As shown in FIG. 3A, on the element substrate 10, the rectangular pixel electrodes 9a are formed for the plurality of pixels 100a, and the data lines 6a and the scanning lines 3a are formed along longitudinal and transverse boundaries of the pixel electrodes 9a. The data lines 6a and the scanning lines 3a linearly extend, and pixel transistors 30 are formed in areas where the data lines 6a and the scanning lines 3a intersect. The capacity lines 5b are formed to overlap with the scanning lines 3a on the element substrate 10. In the embodiment, the capacity lines 5b is provided with a main line part linearly extending to overlap with the scanning lines 3a, and a sub-line part extending to overlap with the data lines 6a at the intersection part of the data lines 6a and the scanning lines 3a.

As shown in FIGS. 3A and 3B, the element substrate 10 mainly includes the pixel electrodes 9a formed on the surface (one side) of the liquid crystal layer 50 side of the substrate body 10w such as a quartz substrate, a glass substrate, and a silicon substrate, the pixel transistors 30 for pixel switching, and the alignment film 16. The opposed substrate 20 mainly includes a transparent substrate body 20w such as a quartz substrate and a glass substrate, the common electrode 21 formed on the surface (one side) of the liquid crystal layer 50 side, and the alignment film 26.

In the element substrate 10, each of the plurality of pixels 100a is provided with the pixel transistor 30 having the semiconductor layer 1a. The semiconductor layer 1a is provided with a channel area 1g, a source area 1b, and a drain area 1c opposed to the gate electrode 3c formed of a part of the scanning line 3a with a gate insulating layer 2 interposed therebetween. The source area 1b and the drain area 1c are provided with a low-concentration area and a high-concentration area, respectively. For example, the semiconductor layer 1a is formed of a polycrystal silicon film or the like formed on a basic insulating film 12 formed of a silicon oxide film or the like, for example, on the substrate body 10w. The gate insulating layer 2 is formed of a silicon oxide film or a silicon nitride film formed by a CVD method or the like. The gate insulating layer 2 may have a 2-layer structure of a silicon oxide film formed by thermally oxidizing the semiconductor layer 1a, and a silicon oxide film or a silicon nitride film formed by a CVD method or the like. A conductive polysilicon film, a metal silicide film, or a metal film is used for the scanning lines 3a.

A first interlayer insulating film 41 formed of a silicon oxide film or the like is formed on the upper layer side of the scanning line 3a, and a lower electrode layer 4a is formed on the upper layer of the first interlayer insulating film 41. The lower electrode layer 4a is formed in a substantially L-shape extending along the scanning line 3a and the data line 6a considering the intersection position of the scanning line 3a and the data line 6a as a base point. The lower electrode layer 4a is formed of a conductive polysilicon film, a metal silicide film, a metal film, or the like, and is electrically connected to the drain area 1c through a contact hole 7c.

A dielectric layer 42 formed of a silicon nitride film or the like is formed on the upper layer side of the lower electrode layer 4a. On the upper layer side of the dielectric layer 42, the capacity line 5b (upper electrode layer) is formed to be opposed to the lower electrode layer 4a with the dielectric layer 42 interposed therebetween, and the retention capacity 55 is formed by the capacity line 5b, the dielectric layer 42, and the lower electrode layer 4a. The capacity line 5b is formed of a conductive polysilicon film, a metal silicide film, or a metal film. Herein, the lower electrode layer 4a, the dielectric layer 42, and the capacity line 5b (upper electrode layer) are formed on the upper layer side of the pixel transistor 30, and overlap with the pixel transistor 30 in the plan view. For this reason, the retention capacity 55 is formed on the upper layer side of the pixel transistor 30, and overlap at least with the pixel transistor 30 in the plan view.

A second interlayer insulating film 43 formed of a silicon oxide film or the like is formed on the upper layer side of the capacity line 5b, and the data line 6a and the drain electrode 6b are formed on the upper layer of the second interlayer insulating film 43. The data line 6a is electrically connected to the source area 1b through the contact hole 7a. The drain electrode 6b is electrically connected to the lower electrode layer 4a through the contact hole 7b, and is electrically connected to the drain area 1c through the lower electrode layer 4a. The data line 6a and the drain electrode 6b are formed of a conductive polysilicon film, a metal silicide film, a metal film, or the like.

Configuration around Pixel Electrode 9a

A third interlayer insulating film 44 formed of a silicon oxide film or the like with a thickness of about 600 nm is formed on the upper layer side of the data line 6a and the drain electrode 6b, and the pixel electrode 9a formed of a reflective conductive film such as an aluminum film is formed on the upper layer side of the third interlayer insulating film 44. The thickness of the pixel electrode 9a is about 200 nm.

In the embodiment, an insulating stress relieving film 46 to be described later is laminated on the upper layer of the third interlayer insulating film 44, and the pixel electrode 9a is laminated on the upper layer of the stress relieving film 46. For example, the thickness of the stress relieving film 46 is about 1/10 of the thickness of the third interlayer insulating film 44. In the embodiment, the thickness of the stress relieving film 46 is about 50 nm. The third interlayer insulating film 44 and the stress relieving film 46 are provided with a contact hole 7d connected to the drain electrode 6b, and the pixel electrode 9a is electrically connected to the drain electrode 6b through the contact hole 7d. In the embodiment, the surface of the stress relieving film 46 is a continuous flat face, and the pixel electrode 9a is formed on the flat face. The flat face may be configured by polishing at least one side of the surface of the third interlayer insulating film 44 and the surface of the stress relieving film 46 as will be described in a producing method. The dummy pixel electrode 9b (not shown in FIG. 3A and FIG. 3B) described with reference to FIG. 2B is formed on the surface of the stress relieving film 46, and the dummy pixel electrode 9b is formed of a reflective conductive film formed together with the pixel electrode 9a.

In the embodiment, a laminated film in which a monolayer film of an aluminum film, a titanium nitride film (lower layer side), and an aluminum film (upper layer side) are laminated, and a laminated film in which a titanium film (lower layer side) and an aluminum film (upper layer side) are laminated, are used as the pixel electrode 9a. When the titanium nitride film or the titanium film is formed on the lower layer side of the aluminum film in the pixel electrode 9a, there is an advantage that it is possible to prevent reflection on the lower side of the pixel electrode 9a and it is possible to prevent stray light from occurring, and an advantage that the surface of the aluminum film becomes flat and the reflectance of the aluminum film is improved.

The alignment film 16 is formed on the surface of the pixel electrode 9a. The alignment film 16 is formed of a resin film such as polyimide or a rhombic vapor-deposited film such as a silicon oxide film. In the embodiment, the alignment film 16 is an inorganic film (vertical alignment film) formed of a rhombic vapor-deposited film such as $SiO_x$ (x<2), $SiO_2$, $TiO_2$, MgO, $Al_2O_3$, $In_2O_3$, $Sb_2O_3$, and $Ta_2O_5$. A planarized insulating film 17 formed of a silicon oxide film or a silicon nitride film is formed as a transparent insulating film between the alignment film 16 and the pixel electrode 9a, and the pixel electrode 9a is covered with the planarized insulating film 17. The planarized insulating film 17 fills a concave portion 9e formed between the pixel electrodes 9a adjacent to each other, and a concave portion 9f formed by the contact hole 7d with respect to the pixel electrode 9a. The surface of the planarized insulating film 17 is a flat face, and the surface of a part overlapping with a gap (concave portion 9e) between the pixel electrodes 9a adjacent to each other, and the surface of a part overlapping with the pixel electrode 9a form a continuous flat face. For this reason, rhombic vapor-deposition is performed on the flat face to form the alignment film 16, and thus it is possible to very appropriately form the rhombic vapor-deposited film constituting the alignment film 16.

Configuration of Third Interlayer Insulating Film 44 and Stress relieving Film 46

In the electro-optic device 100 of the embodiment, the stress relieving film 46 has a thermal expansion coefficient different from that of the third interlayer insulating film 44, comes in contact with the third interlayer insulating film 44, has a thermal expansion coefficient different from that of the pixel electrode 9a, and comes in contact with the pixel electrode 9a. The third interlayer insulating film 44, the stress relieving film 46, and the pixel electrode 9a satisfy the following relation.

Thermal Expansion Coefficient

Third Interlayer Insulating film 44<Stress relieving Film 46<Pixel Electrode 9a

The stress relieving film 46 is a monolayer film having a thermal expansion coefficient between the thermal expansion coefficient of the third interlayer insulating film 44 and the thermal expansion coefficient of the pixel electrode 9a.

More specifically, the third interlayer insulating film 44 is formed of a non-doped silicon oxide film (NSG film) in which all of phosphorus and boron are not doped. The stress relieving film 46 is formed of a doped silicon oxide film in which at least one of phosphorus and boron is doped, such as a phosphorus-doped silicon oxide film (PSG film) in which phosphorus is doped, a boron-doped silicon oxide film (BSG film) in which boron is doped, and a boron-phosphorus-doped silicon oxide film (BPSG film) in which boron and phosphorus are doped. Accordingly, the stress relieving film 46 has a small difference in thermal expansion coefficient from the material constituting the pixel electrode 9a as compared with the third interlayer insulating film 44.

That is, the thermal expansion coefficient of the material constituting the pixel electrode 9a is in the following levels.

Thermal Expansion Coefficient of Aluminum Film=$23.1 \times 10^{-6}/°C$.

Thermal Expansion Coefficient of Titanium Nitride Film=$9.3 \times 10^{-6}/°C$.

Thermal Expansion Coefficient of Titanium Film=$11.0 \times 10^{-6}/°C$.

On the contrary, the thermal expansion coefficients of the stress relieving film 46 and the third interlayer insulating film 44 are in the following levels.

Thermal Expansion Coefficient of Stress relieving Film 46 (doped silicon oxide film)=2 to $4 \times 10^{-6}/°C$.

Thermal Expansion Coefficient of Third Interlayer Insulating Film 44 (non-doped silicon oxide film)= $0.5 \times 10^{-6}/°C$.

Configuration of Opposed Substrate 20 and the like

In the opposed substrate 20, the common electrode 21 formed of a transparent conductive film such as an ITO film is formed on the surface (a face on the side opposed to the element substrate 10) on the liquid crystal layer 50 side of the transparent substrate body 20w such as a quartz substrate and a glass substrate, and the alignment film 26 is formed to cover the common electrode 21. The alignment film 26 is formed of a resin film such as polyimide or a rhombic vapor-deposited film such as a silicon oxide film in the same manner as the alignment film 16. In the embodiment, the alignment film 26 is an inorganic film (vertical alignment film) formed of a rhombic vapor-deposited film such as $SiO_x$ (x<2), $SiO_2$, $TiO_2$, $MgO$, $Al_2O_3$, $In_2O_3$, $Sb_2O_3$, and $Ta_2O_5$, and a protective film 27 such as a silicon oxide film and a silicon nitride film is formed between the alignment film 26 and the common electrode 21. The surface of the protective film 27 is a flat face, and the alignment film 26 is formed on the flat face. In the alignment films 16 and 26, a nematic liquid crystal compound with negative dielectric anisotropy used in the liquid crystal layer 50 is vertically aligned, and the liquid crystal panel 100p operates as a normally black VA mode.

In the data line driving circuit 101 and the scanning line driving circuit 104 described with reference to FIG. 1, FIG. 2A, and FIG. 2B, a complementary type transistor circuit provided with an N-channel type driving transistor and a P-channel type driving transistor is configured. Herein, the driving transistor is formed using a part of the production process of the pixel transistor 30. For this reason, an area where the data line driving circuit 101 and the scanning line driving circuit 104 are formed on the element substrate 10 also has substantially the same cross-sectional configuration as the cross-sectional configuration shown in FIG. 3B.

Method of Producing Electro-Optic Device 100

Figure 4A:
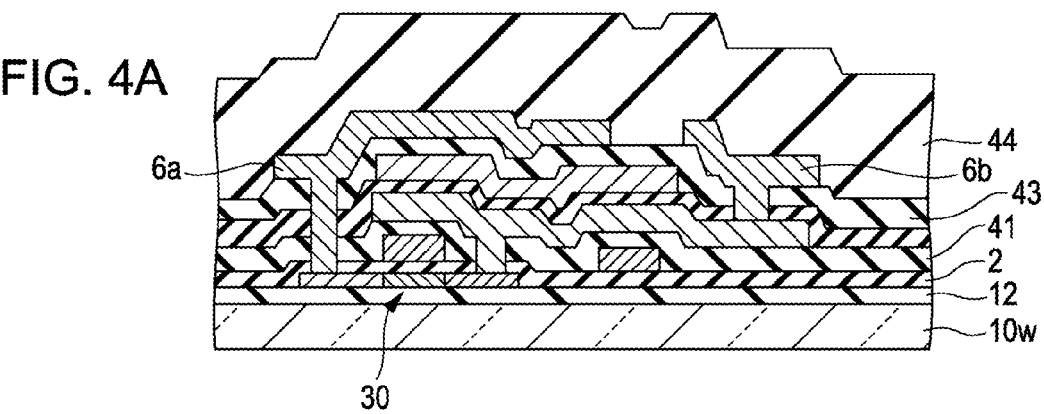
FIG. 4A to FIG. 4D are diagrams illustrating a main part of a method of producing the electro-optic device according to Embodiment 1 of the invention.

FIG. 4A to FIG. 5C are process cross-sectional views illustrating main parts of a method of producing the electro-optic device 100 according to Embodiment 1 of the invention. When the electro-optic device 100 of the invention is produced, in the method of producing the element substrate 10, as shown in FIG. 4A, the pixel transistor 30, the retention capacity 55, and the data line 6a are formed, and then the silicon oxide film (non-doped silicon oxide film) for forming the third interlayer insulating film 44 is formed by a low-pressure CVD method or a plasma CVD method (a process of producing an interlayer insulating film). When the low-pressure CVD method is employed when forming the non-doped silicon oxide film, a film forming temperature is, for example, 650 to 750° C., and a used raw gas is $Si(OC_2H_5)_4$ or the like. When the plasma CVD method is employed when forming the non-doped silicon oxide film, a film forming temperature is, for example, 250 to 450° C., and a used raw gas is $SiH_4$, $N_2O$, or the like. When the non-doped silicon oxide film is formed by the plasma CVD method and the used raw gas is $Si(OC_2H_5)_4$, $O_2$, or the like, a film forming temperature is, for example, 350 to 450° C.

Figure 4B:
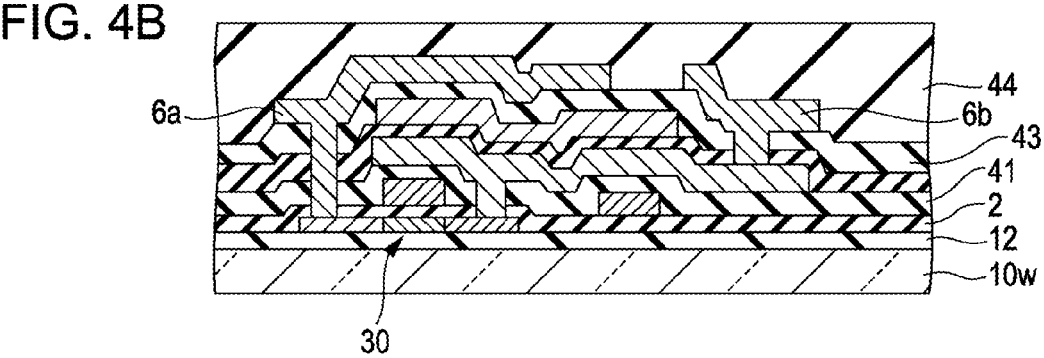

Then, in the planarization process diagram shown in FIG. 4B, the surface of the third interlayer insulating film 44 is polished to planarize the surface. In the planarization process diagram, chemical mechanical polishing may be used. In the chemical mechanical polishing, it is possible to obtain a flat polished face at a high speed by an operation of the chemical component included in polishing liquid and the relative movement between the polishing liquid and the element substrate 10. More specifically, the polishing device performs polishing while relatively rotating a press platen to which polishing cloth (pad) formed of non-woven fabric, urethane foam, phosphorus fluorine resin, or the like is attached, and a holder that holds the element substrate 10. In this case, for example, cerium oxide particles with an average grain diameter of 0.01 to 20 μm, an acrylic acid ester derivative as a dispersion agent, and a polishing agent including water are supplied between the polishing cloth and the element substrate 10.

Figure 4C:
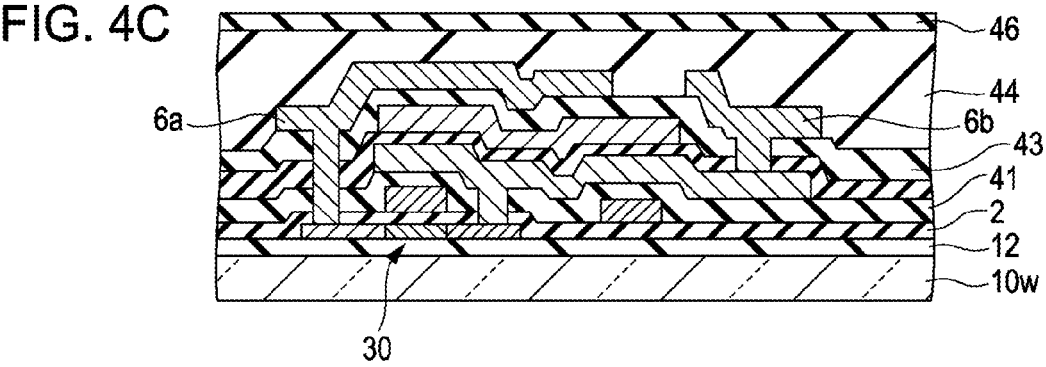

Then, in a stress relieving film forming process shown in FIG. 4C, the stress relieving film 46 formed of a doped silicon oxide film is formed on the upper layer of the third interlayer insulating film 44 by an atmospheric-pressure CVD method or the like. When the stress relieving film 46 is formed, the surface of the third interlayer insulating film 44 is continuous flat face. Accordingly, the surface of the stress relieving film 46 also becomes the continuous flat face. A film forming temperature when forming the stress relieving film 46 is, for example, 350 to 450° C. When the phosphorus-doped silicon oxide film (PSG film) is formed as the stress relieving film 46 (doped silicon oxide film), a used raw gas is $SiH_4$, $PH_3$, $O_3$, or the like. When the boron-doped silicon oxide film (BSG film) is formed, a used raw gas is $SiH_4$, $B_2H_6$, $O_3$, or the like. When the boron-phosphorus-doped silicon oxide film (BPSG film) is formed, a used raw gas is $SiH_4$, $B_2H_6$, $PH_3$, $O_3$, or the like.

Figure 4D:
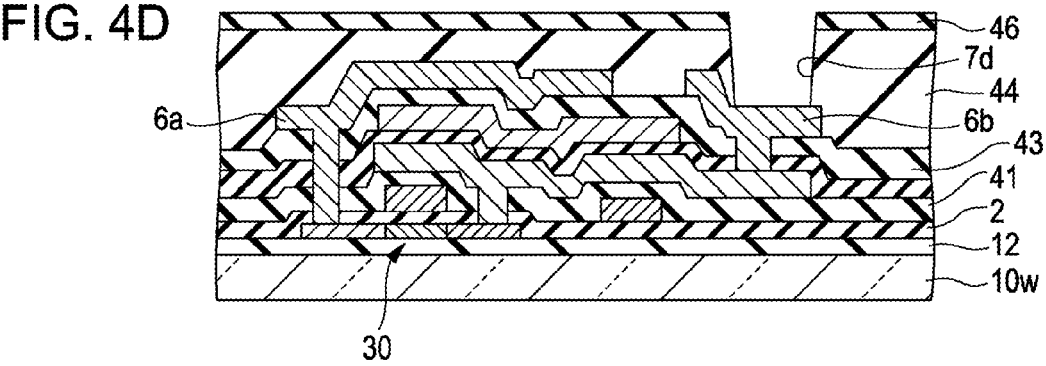

Then, in a contact hole forming process shown in FIG. 4D, a contact hole 7d passing through the stress relieving film 46 and the third interlayer insulating film 44 to the drain electrode 6b is formed.

Figure 5A:
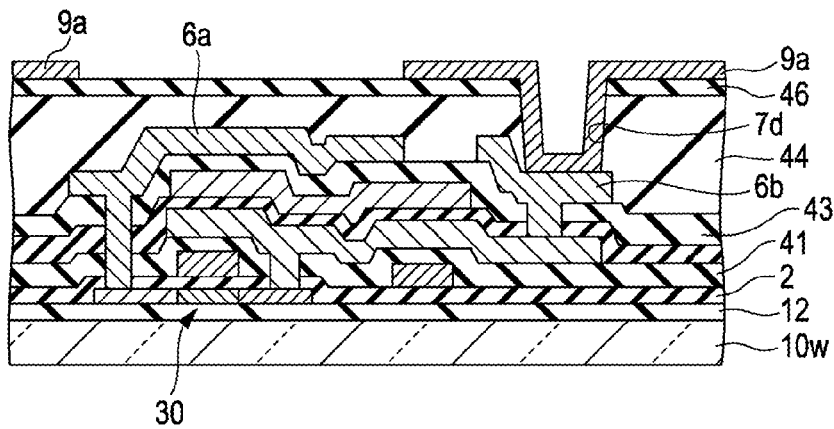
FIG. 5A to FIG. 5C are process cross-sectional views illustrating a main part of a method of producing the electro-optic device according to Embodiment 1 of the invention.

Then, in a pixel electrode forming process shown in FIG. 5A, a reflective conductive film for forming the pixel electrode 9a is formed on the upper layer of the stress relieving film 46, and then patterning is performed on the reflective conductive film to form the pixel electrode 9a.

Figure 5B:
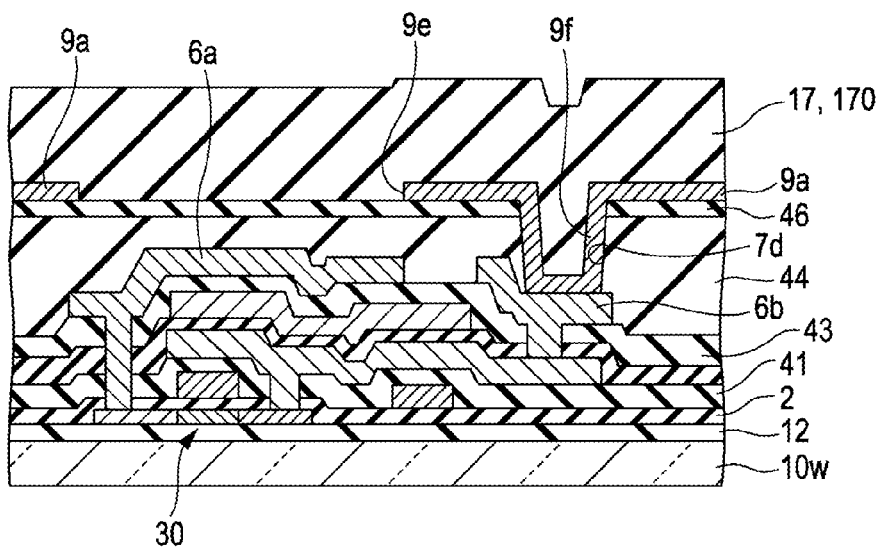

Then, in a planarized film forming process shown in FIG. 5B, a transparent planarized insulating film 17 formed of a non-doped silicon oxide film, a silicon nitride film, or the like is formed thickly by the low-pressure CVD method, the plasma CVD method, or the like. Then, in a planarization process shown in FIG. 5C, the chemical mechanical polishing is performed on the surface of the planarized insulating film 17 to planarize the surface of the planarized insulating film 17. In this case, the planarized insulating film 17 is left to the extent that the surface of the pixel electrode 9a is not exposed. As a result, in the planarized insulating film 17, the surface of a part overlapping with a gap (concave portion 9e) between the pixel electrodes 9a adjacent to each other, and the surface of a part overlapping with the pixel electrode 9a form a continuous flat face. A method of producing the planarized insulating film 17 by the non-doped silicon oxide film is as described above. When the low-pressure CVD method is employed to form the planarized insulating film 17 by the silicon nitride film, a film forming temperature is, for example, 650 to 850° C., and a used raw gas is $SiH_2Cl_2$, $NH_3$, or the like. When the plasma CVD method is employed to form the silicon nitride film, a film forming temperature is, for example, 250 to 400° C., and a used raw gas is $SiH_4$, $NH_3$, or the like.

Figure 5C:
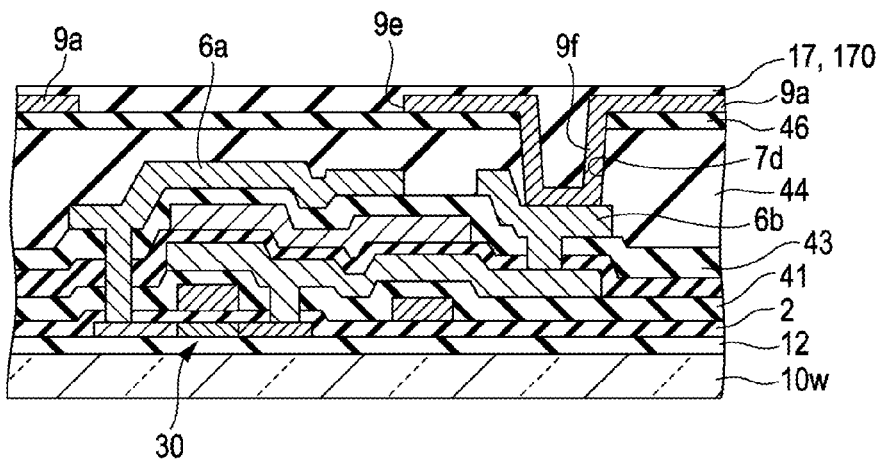

After the planarized insulating film 17 is formed as described above, external connection terminals (not shown) and the like in FIG. 5C are formed. Then, rhombic vapor-deposition is performed on the surface of the planarized insulating film 17, thereby forming the alignment film 16 as shown in FIG. 3A and FIG. 3B.

Main Effect of Embodiment

As described above, in the electro-optic device 100 of the embodiment, the stress relieving film 46 is interposed between the third interlayer insulating film 44 and the pixel electrode 9a, and the stress relieving film 46 has a thermal expansion coefficient different from that of the third interlayer insulating film 44, comes in contact with the third interlayer insulating film 44, has a thermal expansion coefficient different from that of the pixel electrode 9a, and comes in contact with the pixel electrode 9a. For this reason, when the planarized insulating film 17 (insulating film) is formed and even when the thermal stress caused by the difference between the thermal expansion coefficient of the third interlayer insulating film 44 and the thermal expansion coefficient of the pixel electrode 9a occurs in the pixel electrode 9a, it is possible to reduce the occurrence of the thermal stress as compared with the case where the third interlayer insulating film 44 comes in direct contact with the pixel electrode 9a. That is, in the embodiment, the stress relieving film 46 is the monolayer film (doped silicon oxide film) having the thermal expansion coefficient between the thermal expansion coefficient of the third interlayer insulating film 44 (non-doped silicon oxide film) and the thermal expansion coefficient of the pixel electrode 9a (aluminum film or the like), and thus the stress relieving film 46 relieves the difference in thermal expansion coefficient between the third interlayer insulating film 44 and the pixel electrode 9a. Accordingly, it is possible to prevent the thermal stress caused by the difference in thermal expansion coefficient from occurring in the pixel electrode 9a. Therefore, according to the embodiment, it is possible to prevent defects such as hillock caused by the thermal stress from occurring on the surface of the pixel electrode 9a, and thus it is possible to prevent smoothness of the surface of the pixel electrode 9a from decreasing to decrease reflectance of the pixel electrode 9a.

In the embodiment, since the alignment films 16 and 26 are inorganic alignment films, it is not necessary to perform a rubbing process differently from an organic alignment film. Therefore, an increase in costs caused by the rubbing process or a difference in alignment characteristic does not occur.

In the producing method shown in FIG. 4A to FIG. 5C, the surface of the third interlayer insulating film 44 is planarized, but the surface of the stress relieving film 46 may be planarized, and both of the surface of the third interlayer insulating film 44 and the surface of the stress relieving film 46 may be planarized.

Embodiment 2

Figure 6A:
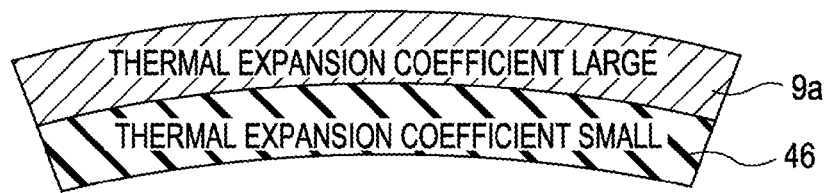
FIG. 6A and FIG. 6B are diagrams illustrating a stress relieving film used in an electro-optic device according to Embodiment 2 of the invention.
Figure 6B:
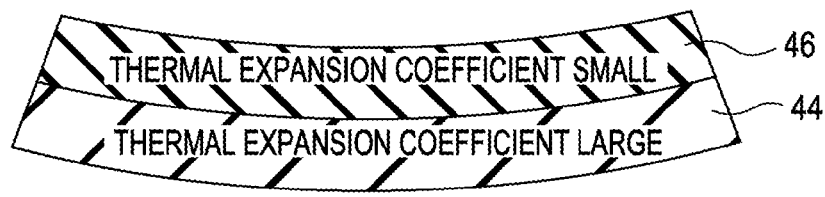

FIG. 6A and FIG. 6B are diagrams illustrating a stress relieving film 46 used in an electro-optic device 100 according to Embodiment 2 of the invention. Since the basic configuration of the embodiment is the same as that of Embodiment 1, the same reference numerals and signs are given to the common parts, and the description thereof is omitted. The basic configuration of the embodiment is described with reference to FIG. 3B.

As shown in FIG. 3B, also in the electro-optic device 100 of the embodiment, similarly to Embodiment 1, the stress relieving film 46 is formed between the third interlayer insulating film 44 and the pixel electrode 9a, the stress relieving film 46 has a thermal expansion coefficient different from that of the third interlayer insulating film 44, comes in contact with the third interlayer insulating film 44, has a thermal expansion coefficient different from that of the pixel electrode 9a, and comes in contact with the pixel electrode 9a.

In the embodiment, the third interlayer insulating film 44, the stress relieving film 46, and the pixel electrode 9a satisfy the following relation.

Thermal Expansion Coefficient

Third Interlayer Insulating film 44>Stress relieving Film 46<Pixel Electrode 9a

More specifically, the third interlayer insulating film 44 is formed of a doped silicon oxide film such as a phosphorus-doped silicon oxide film (PSG film), a boron-doped silicon oxide film (BSG film), and a boron-phosphorus-doped silicon oxide film (BPSG film), and the stress relieving film 46 is formed of a non-doped silicon oxide film (NSG film). Accordingly, the stress relieving film 46 is formed of a monolayer film with a thermal expansion coefficient smaller than those of the third interlayer insulating film 44 and the pixel electrode 9a.

That is, the thermal expansion coefficient of the material constituting the pixel electrode 9a is in the following levels.

Thermal Expansion Coefficient of Aluminum
Film=$23.1 \times 10^{-6}/°$ C.

Thermal Expansion Coefficient of Titanium Nitride
Film=$9.3 \times 10^{-6}/°$ C.

Thermal Expansion Coefficient of Titanium
Film=$11.0 \times 10^{-6}/°$ C.

On the contrary, the thermal expansion coefficients of the stress relieving film 46 and the third interlayer insulating film 44 are in the following levels.

Thermal Expansion Coefficient of Stress relieving
Film 46(non-doped silicon oxide film)=$0.5 \times 10^{-6}/°$ C.

Thermal Expansion Coefficient of Third Interlayer
Insulating Film 44(doped silicon oxide film)=2 to $4 \times 10^{-6}/°$ C.

It is a structure in which the stress relieving film 46 is provided between the layers with a large thermal expansion coefficient (the third interlayer insulating film 44 and the pixel electrode 9a) from up and down.

Accordingly, in the embodiment, as shown in FIG. 6A, the thermal expansion coefficient of the pixel electrode 9a is larger than that of the stress relieving film 46 between the stress relieving film 46 and the pixel electrode 9a, and thus the stress of bending upward in a high-temperature atmosphere occurs. On the contrary, as shown in FIG. 6B, the thermal expansion coefficient of the third interlayer insulating film 44 is larger than that of the stress relieving film 46 between the third interlayer insulating film 44 and the stress relieving film 46, and thus the stress of bending downward in a high-temperature atmosphere occurs. For this reason, the thermal stress caused by the difference in thermal expansion coefficient between the third interlayer insulating film 44 and the stress relieving film 46 and the thermal stress caused by the difference in thermal expansion coefficient between the stress relieving film 46 and the pixel electrode 9a cancel each other out, and thus the thermal stress occurring in the pixel electrode 9a is relieved. Therefore, it is possible to prevent defects such as hillock caused by the thermal stress from occurring on the surface of the pixel electrode 9a, and thus the same effect as that of Embodiment 1 is obtained.

Embodiment 3

Figure 7:
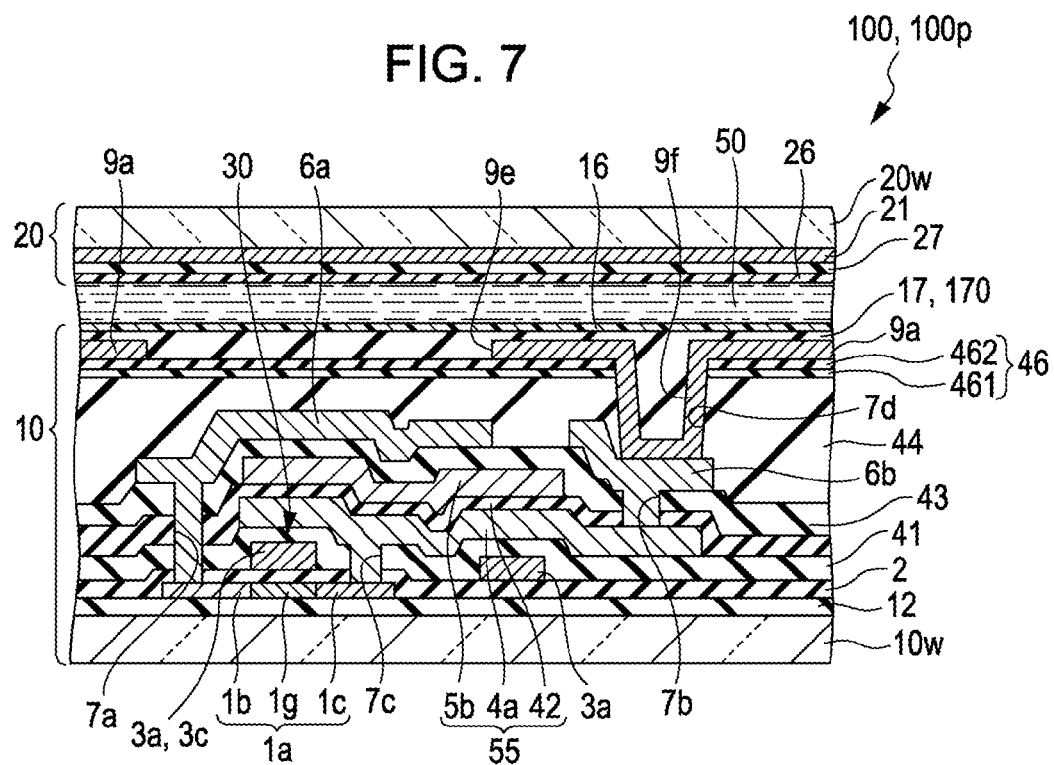
FIG. 7 is a cross-sectional view illustrating a pixel of an electro-optic device according to Embodiment 3 of the invention.

FIG. 7 is a cross-sectional view illustrating a pixel of an electro-optic device 100 according to Embodiment 3 of the invention. FIG. 8 is a diagram illustrating a stress relieving film 46 used in the electro-optic device 100 according to Embodiment 3 of the invention. Since the basic configuration of the embodiment is the same as that of Embodiment 1, the same reference numerals and signs are given to the common parts, and the description thereof is omitted. As shown in FIG. 7, also in the electro-optic device 100 of the embodiment, similarly to Embodiment 1, the stress relieving film 46 is formed between the third interlayer insulating film 44 and the pixel electrode 9*a*.

In the embodiment, the stress relieving film 46 is provided with a first stress relieving film 461 on the lower layer side having a thermal expansion coefficient different from that of the third interlayer insulating film 44 and coming in contact with the third interlayer insulating film 44, and a second stress relieving film 462 on the upper layer side having a thermal expansion coefficient different from those of the first stress relieving film 461 and the pixel electrode 9*a* and coming in contact with the first stress relieving film 461 and the pixel electrode 9*a*. For this reason, the stress relieving film 46 has a thermal expansion coefficient different from that of the third interlayer insulating film 44, comes in contact with the third interlayer insulating film 44, has a thermal expansion coefficient different from that of the pixel electrode 9*a*, and comes in contact with the pixel electrode 9*a*. In the embodiment, the thickness of the stress relieving film 46 is about 50 nm, and each thickness of the first stress relieving film 461 and the second stress relieving film 462 is about 25 nm.

In the embodiment, the thermal expansion coefficients of the third interlayer insulating film 44 and the stress relieving film 46 (the first stress relieving film 461 and the second stress relieving film 462) satisfy the following relation.
Thermal Expansion Coefficient > Third Interlayer Insulating film 44<First Stress relieving Film 461>Second Stress relieving Film 462<Pixel Electrode 9a More specifically, the third interlayer insulating film 44 is formed of a non-doped silicon oxide film (NSG film), the first stress relieving film 461 is formed of a doped silicon oxide film such as a phosphorus-doped silicon oxide film (PSG film), a boron-doped silicon oxide film (BSG film), and a boron-phosphorus-doped silicon oxide film (BPSG film), and the second stress relieving film 462 is formed of a non-doped silicon oxide film (NSG film). Accordingly, the first stress relieving film 461 has a thermal expansion coefficient larger than that of the third interlayer insulating film 44, and the second stress relieving film 462 has a thermal expansion coefficient smaller than those of the first stress relieving film 461 and the pixel electrode 9*a*.

That is, the thermal expansion coefficient of the material constituting the pixel electrode 9*a* is in the following levels.

> Thermal Expansion Coefficient of Aluminum Film=$23.1 \times 10^{-6}/°$ C.

> Thermal Expansion Coefficient of Titanium Nitride Film=$9.3 \times 10^{-6}/°$ C.

> Thermal Expansion Coefficient of Titanium Film=$11.0 \times 10^{-6}/°$ C.

On the contrary, the thermal expansion coefficients of the stress relieving film 46 (the first stress relieving film 461 and the second stress relieving film 462) and the third interlayer insulating film 44 are in the following levels.

> Thermal Expansion Coefficient of Second Stress relieving Film 462(non-doped silicon oxide film)=$0.5 \times 10^{-6}/°$ C.

> Thermal Expansion Coefficient of First Stress relieving Film 461(doped silicon oxide film)=2 to $4 \times 10^{-6}/°$ C.

> Thermal Expansion Coefficient of Third Interlayer Insulating Film 44(non-doped silicon oxide film)=$0.5 \times 10^{-6}/°$ C.

The first stress relieving film 461 is provided between the third interlayer insulating film 44 and the second stress relieving film 462 from up and down, and the second stress relieving film 462 is provided between the first stress relieving film 461 and the pixel electrode 9*a* from up and down.

Figure 8A:
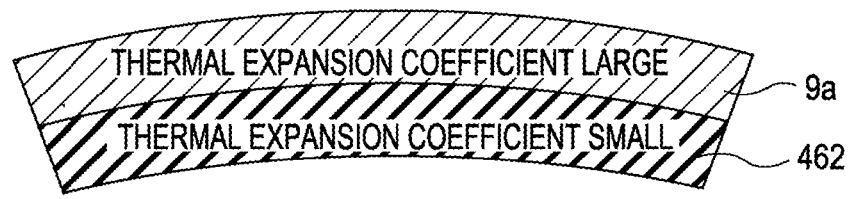
FIG. 8A to FIG. 8C are diagrams illustrating a stress relieving film used in the electro-optic device according to Embodiment 3 of the invention.
Figure 8B:
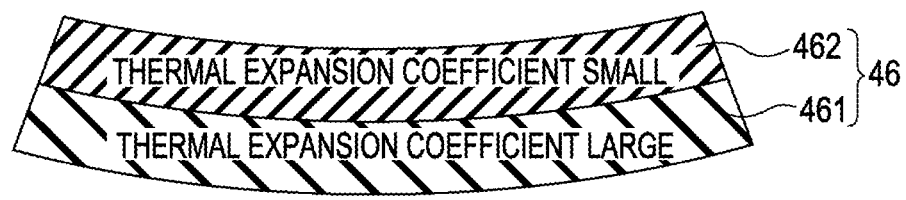
Figure 8C:
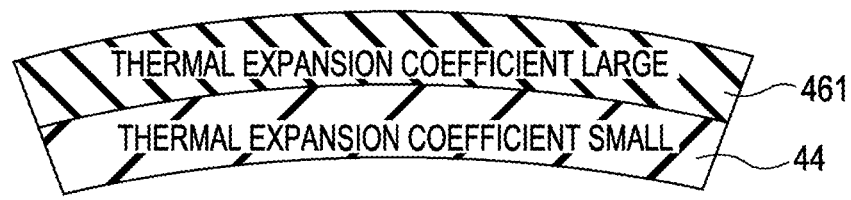

Accordingly, in the embodiment, as shown in FIG. 8A, the thermal expansion coefficient of the pixel electrode 9*a* is larger than that of the second stress relieving film 462 between the second stress relieving film 462 and the pixel electrode 9*a*, and thus the stress of bending upward in a high-temperature atmosphere occurs. As shown in FIG. 8B, the thermal expansion coefficient of the first stress relieving film 461 is larger than that of the second stress relieving film 462 between the first stress relieving film 461 and the second stress relieving film 462, and thus the stress of bending downward in a high-temperature atmosphere occurs. As shown in FIG. 8C, the thermal expansion coefficient of the first stress relieving film 461 is larger than that of the third interlayer insulating film 44 between the third interlayer insulating film 44 and the first stress relieving film 461, and thus the stress of bending upward in a high-temperature atmosphere occurs. For this reason, the thermal stress caused by the difference in thermal expansion coefficient between the third interlayer insulating film 44 and the first stress relieving film 461, the thermal stress caused by the difference in thermal expansion coefficient between the first stress relieving film 461 and the second stress relieving film 462, and the thermal stress caused by the difference in thermal expansion coefficient between the second stress relieving film 462 and the pixel electrode 9*a* cancel each other out, and thus the thermal stress occurring in the pixel electrode 9*a* is relieved. Therefore, it is possible to prevent defects such as hillock caused by the thermal stress from occurring on the surface of the pixel electrode 9*a*, and thus the same effect as those of Embodiments 1 and 2 is obtained.

Embodiment 4

Since the basic configuration of the embodiment is the same as that of Embodiment 1, the same reference numerals and signs are given to the common parts, and the description thereof is omitted. The basic configuration of the embodiment is described with reference to FIG. 3B.

As shown in FIG. 3B, also in the electro-optic device 100 of the embodiment, similarly to Embodiment 1, the stress relieving film 46 is formed between the third interlayer insulating film 44 and the pixel electrode 9*a*, the stress relieving film 46 has a thermal expansion coefficient different from that of the third interlayer insulating film 44, comes in contact with the third interlayer insulating film 44, has a thermal expansion coefficient different from that of the pixel electrode 9*a*, and comes in contact with the pixel electrode 9*a*.

In the embodiment, the planarized insulating film 17 (insulating film) is formed of a doped silicon oxide film such as a phosphorus-doped silicon oxide film (PSG film), a boron-doped silicon oxide film (BSG film), and a boron-phosphorus-doped silicon oxide film (BPSG film). The doped silicon oxide film has a small difference in thermal expansion coefficient from the material constituting the pixel electrode 9*a* as compared with the non-doped silicon oxide film in which all of phosphorus and boron are not doped.

That is, the thermal expansion coefficient of the material constituting the pixel electrode 9*a* is in the following levels.

> Thermal Expansion Coefficient of Aluminum Film=$23.1 \times 10^{-6}/°$ C.

Thermal Expansion Coefficient of Titanium Nitride
Film=9.3×10$^{-6}$/° C.

Thermal Expansion Coefficient of Titanium
Film=11.0×10$^{-6}$/° C.

On the contrary, the thermal expansion coefficients of the doped silicon oxide film and the non-doped silicon oxide film are in the following levels.

Doped Silicon Oxide Film 170=2 to 4×10$^{-6}$/° C.

Thermal Expansion Coefficient of Non-Doped Silicon
Oxide Film=0.5×10$^{-6}$/° C.

For this reason, according to the embodiment, in addition to the same effect as that of Embodiment 1, the following effects are obtained: the difference in thermal expansion coefficient from the materials constituting the planarized insulating film 17 and the pixel electrode 9a is small, a significant thermal stress does not occur in the pixel electrode 9a and the planarized insulating film 17 even when the planarized insulating film 17 is formed in a state where it is heated, and defects such as hillock hardly occur on the surface of the pixel electrode 9a. It is possible to prevent smoothness of the surface of the pixel electrode 9a from decreasing to decrease reflectance of the pixel electrode 9a due to defects such as hillock. Since the doped silicon oxide film 170 is excellent in a level-difference coating property, a hollow hardly occurs at a part filling a concave portion 9f with respect to the doped silicon oxide film 170 even when the concave portion 9f caused by the contact hole 7d is formed on the surface of the pixel electrode 9a. Therefore, it is possible to prevent the contrast of a displayed image from decreasing caused by scattering in the reflection direction on the pixel electrode 9a due to exposure of the hollow on the surface of the planarized insulating film 17. In the embodiment, the structure described in Embodiment 1 is employed in the lower layer side of the pixel electrode 9a, but the structure described in Embodiments 2 and 3 may be employed in the lower layer side of the pixel electrode 9a.

Embodiment 5

Figure 9:
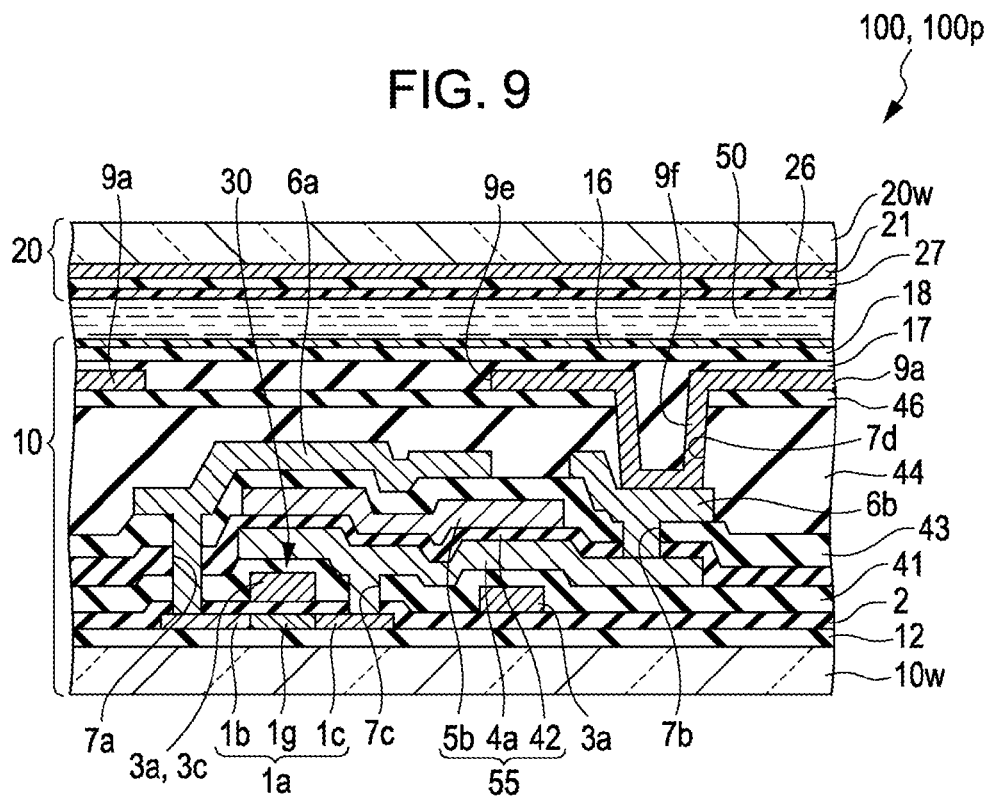
FIG. 9 is a cross-sectional view illustrating a pixel of an electro-optic device according to Embodiment 5 of the invention.

FIG. 9 is a cross-sectional view illustrating a pixel of an electro-optic device 100 according to Embodiment of the invention. Since the basic configuration of the embodiment is the same as that of Embodiment 1, the same reference numerals and signs are given to the common parts, and the description thereof is omitted.

As shown in FIG. 9, also in the element substrate used in the electro-optic device 100 of the embodiment, similarly to Embodiment 1, the stress relieving film 46 is formed between the third interlayer insulating film 44 and the pixel electrode 9a, the stress relieving film 46 has a thermal expansion coefficient different from that of the third interlayer insulating film 44, comes in contact with the third interlayer insulating film 44, has a thermal expansion coefficient different from that of the pixel electrode 9a, and comes in contact with the pixel electrode 9a.

In the embodiment, similarly to Embodiment 4, the planarized insulating film 17 (insulating film) is formed of a doped silicon oxide film such as a phosphorus-doped silicon oxide film (PSG film), a boron-doped silicon oxide film (BSG film), and a boron-phosphorus-doped silicon oxide film (BPSG film). The doped silicon oxide film has a small difference in thermal expansion coefficient from the material constituting the pixel electrode 9a as compared with the non-doped silicon oxide film in which all of phosphorus and boron are not doped.

In the embodiment, a protective film 18 formed of a non-doped silicon oxide film is laminated on the upper layer of the planarized insulating film 17, and an alignment film 16 (inorganic alignment film/rhombic vapor-deposited film) is laminated on the upper layer of the protective film 18. In the configuration, in the planarized insulating film 17, the surface of a part overlapping with a gap (concave portion 9e) between the pixel electrodes 9a adjacent to each other, and the surface of a part overlapping with the pixel electrode 9a form a continuous flat face, and thus the surface of the protective film 18 is a flat face even when a polishing process is not performed.

With such a configuration, in addition to the effect described in Embodiment 1 or Embodiment 4, the protective film 18 formed of the non-doped silicon oxide film is formed on the upper layer of the planarized insulating film 17 formed of the doped silicon oxide film, and thus reliability of the electro-optic device 100 is high. That is, the doped silicon oxide film is satisfactory in the viewpoint of prevention of occurrence of hillock or prevention of occurrence of hollow in the pixel electrode 9a, but moisture is easily absorbed. For this reason, the moisture may be discharged from the doped silicon oxide film, and the moisture may infiltrate into the liquid crystal layer 50. However, when the non-doped silicon oxide film (protective film 18) is laminated on the surface of the planarized insulating film 17 (doped silicon oxide film), it is possible to prevent the moisture from infiltrating into the liquid crystal layer by the non-doped silicon oxide film (protective film 18), which is an advantage. In the embodiment, the structure described in Embodiment 1 is employed in the lower layer side of the pixel electrode 9a, but the structure described in Embodiments 2 and 3 may be employed in the lower layer side of the pixel electrode 9a.

Embodiment 6

Figure 10:
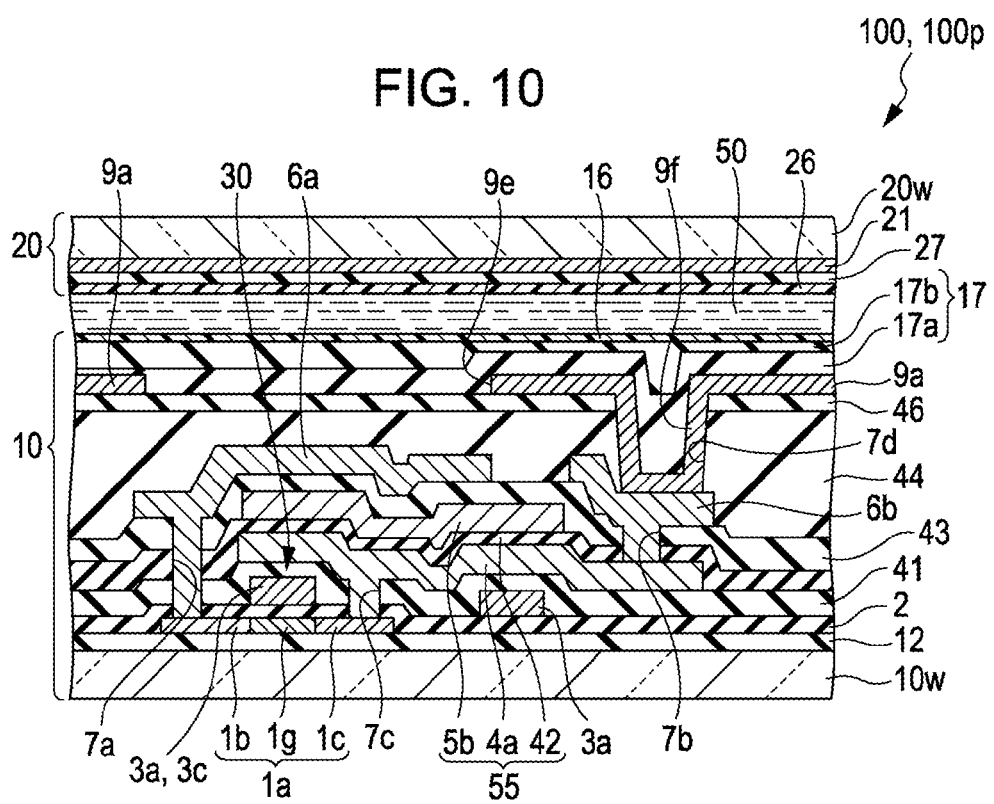
FIG. 10 is a cross-sectional view illustrating a pixel of an electro-optic device according to Embodiment 6 of the invention.

FIG. 10 is a cross-sectional view illustrating a pixel of an electro-optic device 100 according to Embodiment 6 of the invention. Since the basic configuration of the embodiment is the same as that of Embodiment 1, the same reference numerals and signs are given to the common parts, and the description thereof is omitted.

As shown in FIG. 10, also in the element substrate 10 used in the electro-optic device 100 of the embodiment, similarly to Embodiment 1, the stress relieving film 46 is formed between the third interlayer insulating film 44 and the pixel electrode 9a, the stress relieving film 46 has a thermal expansion coefficient different from that of the third interlayer insulating film 44, comes in contact with the third interlayer insulating film 44, has a thermal expansion coefficient different from that of the pixel electrode 9a, and comes in contact with the pixel electrode 9a.

In the embodiment, the planarized insulating film 17 (insulating film) is provided with a first insulating film 17a laminated on the pixel electrode 9a, and a second insulating film 17b laminated on the first insulating film 17a, and the first insulating film 17a is a doped silicon oxide film. Herein, the second insulating film 17b is formed of a non-doped silicon oxide film. The planarized insulating film 17 has a 2-layer structure of the first insulating film 17a (doped silicon oxide film) and the second insulating film 17b (doped silicon oxide film). However, the lowest layer coming in contact with at least the pixel electrode 9a in the planarized insulating film 17 is formed of a doped silicon oxide film.

The first insulating film 17a substantially fills a concave portion 9e formed between the pixel electrodes 9a adjacent to each other, and a concave portion 9f formed by the contact hole 7d with respect to the pixel electrode 9a. However, unevenness caused by unevenness on the lower layer side is formed on the surface of the first insulating film 17a. On the contrary, the second insulating film 17b is a non-doped silicon oxide film. In the second insulating film 17b, the surface of a part overlapping with the pixel electrode 9a, and the surface of a part overlapping with a gap between the pixel electrodes 9a adjacent to each other form a continuous flat face. The configuration may be realized by planarizing the surface of the second insulating film 17b by chemical mechanical polishing after forming the first insulating film 17a and the second insulating film 17b in this order.

With such a configuration, in addition to the effect described in Embodiment 1 or Embodiment 4, there is an advantage that it is possible to prevent moisture from being discharged from the first insulating film 17a (doped silicon oxide film) by the second insulating film 17b (non-doped silicon oxide film) as described in Embodiment 5, since the non-doped silicon oxide film (the second insulating film 17b) is formed on the upper layer of the doped-silicon oxide film (the first insulating film 17a).

In the embodiment, the surface of the second insulating film 17b (non-doped silicon oxide film) is polished, but the surface of the first insulating film 17a (doped silicon oxide film) is not polished. For this reason, it is possible to prevent the polishing device from being contaminated by phosphorus or boron. In the embodiment, the structure described in Embodiment 1 is employed in the lower layer side of the pixel electrode 9a, but the structure described in Embodiments 2 and 3 may be employed in the lower layer side of the pixel electrode 9a.

Modified Example of Embodiment 6

In Embodiment 6, the surface of the first insulating film 17a (doped silicon oxide film) is not polished, and only the surface of the second insulating film 17b (non-doped silicon oxide film) is polished. However, both of the surface of the first insulating film 17a (doped silicon oxide film) and the surface of the second insulating film 17b (non-doped silicon oxide film) may be polished.

Application Example of Other Electro-Optic Device

In the embodiment, as the element substrate 10 of the electro-optic device 100, the invention is applied to the element substrate 10 of the reflection-type liquid crystal device, but the invention may be applied to element substrates of the other electro-optic devices such as an organic electroluminescence display device and a plasma display device.

Example of Mounting on Electronic Apparatus

Figure 11:
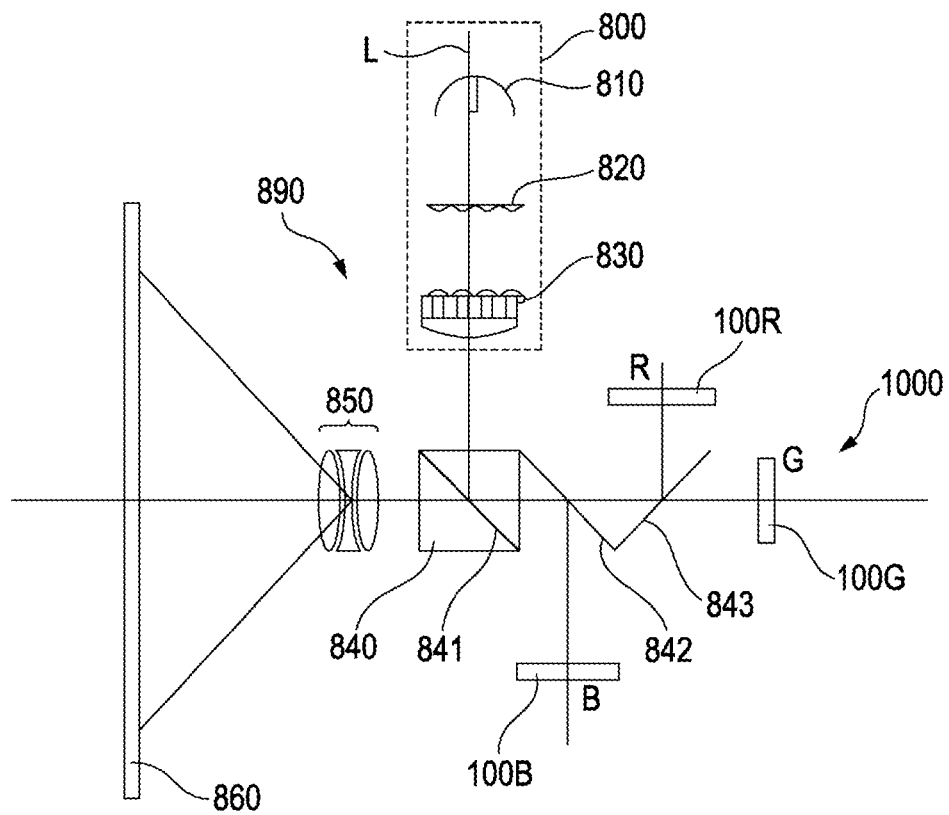
FIG. 11 is a diagram illustrating a schematic configuration of a projection-type display apparatus using the electro-optic device (reflection-type liquid crystal device) according to the invention.

An electronic apparatus to which the electro-optic device 100 according to the embodiment described above is applied will be described. FIG. 11 is a diagram illustrating a schematic configuration of a projection-type display apparatus using the electro-optic device 100 (reflection-type liquid crystal device) according to the invention.

In a projection-type display apparatus 1000 shown in FIG. 11, a light source unit 890 has a polarization lighting device 800 provided with a light source 810, an integrator lens 820, and a polarization conversion element 830 along a system optical axis L. The light source unit 890 is provided with a polarization beam splitter 840 that reflects S-polarization light flux output from the polarization lighting device 800 by an S-polarization light flux reflection face 841, a dichroic mirror 842 that separates the blue light component (B) of the light reflected from the S-polarization light flux reflection face 841 of the polarization beam splitter 840, and a dichroic mirror 843 that reflects and separates the red light component (R) of the light flux after separating the blue light, along the system optical axis L.

The projection-type display apparatus 1000 is provided with three reflection-type electro-optic devices 100 (reflection-type liquid crystal devices 100R, 100G, and 100B) to which each color of light is input, and the light source unit 890 supplies a predetermined color of light to the three electro-optic devices 100 (liquid crystal devices 100R, 100G, and 100B).

In the projection-type display apparatus 1000, the light modulated in the three liquid crystal devices 100R, 100G, and 100B are synthesized in the dichroic mirrors 842 and 843 and the polarization beam splitter 840, and then the synthesized light is projected to a projection target member such as a screen 860 by a projection optical system 850.

Other Projection-Type Display Apparatus

In the projection-type display apparatus, an LED light source that outputs each color of light is used as the light source unit, and each color of light output from the LED light source may be supplied to each of individual liquid crystal devices.

Other Electronic Apparatus

As for the electro-optic device 100 according to the invention, in addition to the above-described electronic apparatus, electronic apparatuses such as mobile phones, information mobile terminals (PDA: Personal Digital Assistants), digital cameras, liquid crystal TVs, car navigation devices, video phones, POS terminals, and apparatuses provided with a touch panel may be used as direct view type display devices.

This application claims priority from Japanese Patent Application No. 2010-254587 filed in the Japanese Patent Office on Nov. 15, 2010, the entire disclosure of which is hereby incorporated by reference in its entirely.

What is claimed is:

1. An electro-optic device comprising:
a pixel transistor that is provided on one side of a substrate of an element substrate;
an interlayer insulating film that covers the pixel transistor on a side of the pixel transistor opposite to a substrate side of the pixel transistor;
a reflective pixel electrode corresponding to the pixel transistor and being provided on a side of the interlayer insulating film opposite to a substrate side of the interlaying insulating film, the reflective pixel electrode having a thermal expansion coefficient different from that of the interlayer insulating film, the reflective pixel electrode including aluminum;
a transparent insulating film that overlaps with the reflective pixel electrode on a side of the reflective pixel electrode opposite to a substrate side of the reflective pixel electrode; and
an insulating stress relieving film that is provided between the interlayer insulating film and the reflective pixel electrode, a part of the insulating stress relieving film coming in contact with the interlayer insulating film and having a thermal expansion coefficient different from a thermal expansion coefficient of the interlayer insulating film, and a part of the insulating stress relieving film coming in contact with the reflective pixel electrode and having a thermal expansion coefficient different from a thermal expansion coefficient of the reflective pixel electrode,
wherein the reflective pixel electrode has a reflective surface being covered with an alignment film, and
wherein the stress relieving film has a thermal expansion coefficient between the thermal expansion coefficient of the interlayer insulating film and the thermal expansion coefficient of the reflective pixel electrode.

2. The electro-optic device according to claim 1, wherein a surface layer of the reflective pixel electrode on the transparent insulating film side is formed of an aluminum film.

3. The electro-optic device according to claim 1, wherein the stress relieving film is a monolayer film having a thermal expansion coefficient larger than the thermal expansion coefficient of the interlayer insulating film and smaller than the thermal expansion coefficient of the reflective pixel electrode.

4. The electro-optic device according to claim 1, wherein the stress relieving film is provided with a first stress relieving film having a thermal expansion coefficient different from that of the interlayer insulating film and coming in contact with the interlayer insulating film, and a second stress relieving film having a thermal expansion coefficient different from those of the first stress relieving film and the reflective pixel electrode and coming in contact with the first stress relieving film and the reflective pixel electrode.

5. The electro-optic device according to claim 4, wherein the first stress relieving film has a thermal expansion coefficient larger than that of the interlayer insulating film, and
wherein the second stress relieving film has a thermal expansion coefficient smaller than those of the first stress relieving film and the reflective pixel electrode.

6. The electro-optic device according to claim 1, wherein at least a part of the insulating film coming in contact with the reflective pixel electrode is formed of a doped silicon oxide film which is doped by at least one of phosphorus and boron.

7. The electro-optic device according to claim 1, further comprising:
an opposed substrate that is opposed to one side of the element substrate; and
a liquid crystal layer that is kept between the element substrate and the opposed substrate,
wherein the alignment film is provided on the outermost surface of the element substrate.

8. The electro-optic device according to claim 7, wherein the alignment film is formed of an inorganic alignment film.

9. A projection-type display apparatus provided with the electro-optic device according to claim 7, comprising:
a light source unit that outputs light supplied to the electro-optic device; and
a projection optical system that projects light modulated by the electro-optic device.

10. The electro-optic device according to claim 1, wherein the thickness of the insulating stress relieving film is no more than approximately one-tenth of the thickness of the interlayer insulating film.

11. The electro-optic device according to claim 1, wherein the reflective pixel electrode includes an upper layer formed of an aluminum film and a lower layer formed of a titanium film or a titanium nitride film.

12. An electro-optical device comprising:
a substrate;
a pixel transistor;
an interlayer insulating film, the pixel transistor being disposed between the substrate and the interlayer insulating film;
a pixel electrode that reflects light, the pixel electrode electrically connecting to the pixel transistor, the pixel electrode including aluminum;
an alignment film that covers the pixel electrode; and
an insulating stress relieving film that is disposed between the interlayer insulating film and the pixel electrode,
wherein
the pixel electrode has a reflective surface being covered with the alignment film,
a thermal expansion coefficient of the insulating stress relieving film is larger than a thermal expansion coefficient of the interlayer insulating film, and
the thermal expansion coefficient of the insulating stress relieving film is smaller than a thermal expansion coefficient of the pixel electrode.

13. The electro-optical device according to claim 12, further comprising:
a relay electrode that electrically connects the pixel transistor and the pixel electrode.

14. The electro-optical device according to claim 13, further comprising:
a through hole that penetrates the insulating stress relieving film and the interlayer insulating film,
the relay electrode connecting to the pixel electrode via the through hole.

15. The electro-optical device according to claim 12, wherein:
the insulating stress relieving film contacts the interlayer insulating film and the pixel electrode.

* * * * *